(12) United States Patent
Wolf et al.

(10) Patent No.: US 7,985,395 B2
(45) Date of Patent: Jul. 26, 2011

(54) THERMALLY STABLE CATALYST FOR HYDROGEN CHLORIDE GAS PHASE OXIDATION

(75) Inventors: Aurel Wolf, Wülfrath (DE); Leslaw Mleczko, Dormagen (DE); Oliver Felix-Karl Schlüter, Leverkusen (DE); Stephan Schubert, League City, TX (US)

(73) Assignee: Bayer Technology Services GmbH, Leverkusen (DE)

( * ) Notice: Subject to any disclaimer, the term of this patent is extended or adjusted under 35 U.S.C. 154(b) by 0 days.

(21) Appl. No.: 12/665,848

(22) PCT Filed: Jun. 26, 2008

(86) PCT No.: PCT/EP2008/005183
§ 371 (c)(1), (2), (4) Date: Jan. 14, 2010

(87) PCT Pub. No.: WO2009/010167
PCT Pub. Date: Jan. 22, 2009

(65) Prior Publication Data
US 2010/0183498 A1    Jul. 22, 2010

(30) Foreign Application Priority Data

Jul. 13, 2007 (DE) .......... 10 2007 033 113
Jul. 13, 2007 (DE) .......... 10 2007 033 114

(51) Int. Cl.
*C01B 7/04* (2006.01)
*B01J 23/00* (2006.01)
*B01J 21/00* (2006.01)
*B01J 20/00* (2006.01)

(52) U.S. Cl. ........ 423/502; 502/242; 502/258; 502/259; 502/260; 502/261; 502/262; 502/263; 502/326; 502/327; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/353; 502/354; 502/355; 502/415; 502/439; 423/253; 423/260; 423/261

(58) Field of Classification Search .......... 502/242, 502/258, 259, 260, 261, 262, 263, 326, 327, 502/330–339, 340–351, 353–355, 415, 439; 423/253, 260, 261, 502
See application file for complete search history.

(56) References Cited

U.S. PATENT DOCUMENTS

| | | | | |
|---|---|---|---|---|
| 3,042,486 | A * | 7/1962 | Forward et al. | 423/261 |
| 3,198,750 | A | 8/1965 | Callahan et al. | |
| 3,308,151 | A | 3/1967 | Callahan et al. | |
| 3,355,393 | A * | 11/1967 | Swanson | 252/639 |
| 3,786,120 | A * | 1/1974 | Hollander et al. | 264/5 |
| 3,796,672 | A * | 3/1974 | Dada et al. | 252/636 |
| 3,941,870 | A * | 3/1976 | Ekstrom et al. | 423/258 |
| 5,908,607 | A | 6/1999 | Abekawa et al. | |
| 6,096,281 | A * | 8/2000 | Bulko et al. | 423/260 |
| 6,153,164 | A * | 11/2000 | Bulko et al. | 423/260 |
| 6,224,841 | B1 * | 5/2001 | Taylor et al. | 423/245.3 |
| 2001/0014305 | A1 * | 8/2001 | Ioffe | 423/261 |

FOREIGN PATENT DOCUMENTS

| | | |
|---|---|---|
| DE | 1 078 100 | 3/1960 |
| DE | 1 567 788 A1 | 5/1970 |
| DE | 197 34 412 A1 | 2/1998 |
| DE | 197 48 299 A1 | 5/1998 |
| GB | 1046313 A | 10/1966 |

OTHER PUBLICATIONS

Campbell et al., "Effects of Precursor and Support Variation in the Performance of Uranium Oxide Catalysts for CO Oxidation and Selective Reduction of NO", Journal of Molecular Catalysis A: Chemical 245, p. 62-68, (2006).

Choudhary et al., "A Green Process for Chlorine-free Benzaldehyde from the Solvent-free Oxidation for Benzyl Alcohol with Molecular Oxygen over a Supported Nano-size Gold Catalyst", The Royal Society of Chemistry, Green Chem., vol. 7, p. 768-770 (2005).

Choudhary et al., "Solvent-free Selective Oxidation of Benzyl Alcohol by Molecular Oxygen over Uranium Oxide Supported Nano-gold Catalyst for the Production of Chlorine-free Benzaldehyde", The Royal Society of Chemistry, Green Chem., vol. 9, p. 267-272, (2007).

Ertl et al., "Handbook of Heterogeneous Catalysis", Organic Reactions, p. 2160.

Hutchings et al., "Uranium-oxide-based Catalysts for the Destruction of Volatile Chloro-organic Compounds", Nature, vol. 384, p. 341-343, Nov. 28, 1996.

Corberan et al., "Partial Oxidation of Isobutene over MoO3-UO3-SIO2 Catalysis. A Reaction Network", American Chemical Society, Ind. Eng. Chem. Prod. Res. Dev., vol. 23, p. 546-552, (1984).

Corberan et al., "Kinetics of the Partial Oxidation of Isobutene over Silica-Supported Molybdenum-Uranium Oxide Catalyst", American Chemical Society, Ind. Eng. Chem. Prod. Res. Dev., vol. 24, p. 62-68 (1985).

Ertl et al., "Handbook of Heterogeneous Catalysis", Hydrogenation Reactions, p. 2181.

\* cited by examiner

*Primary Examiner* — Cam N. Nguyen
(74) *Attorney, Agent, or Firm* — Norris McLaughlin & Marcus PA

(57) ABSTRACT

Catalyst for oxidation reactions which comprises at least one constituent active in the catalysis of hydrogen chloride oxidation and support therefor, which support is based on uranium oxide. The catalyst is notable for a high stability and activity.

10 Claims, No Drawings

US 7,985,395 B2

THERMALLY STABLE CATALYST FOR HYDROGEN CHLORIDE GAS PHASE OXIDATION

This is a 371 of PCT/EP2008/005183 filed 26 Jun. 2008 (international filing date).

The present invention relates to a catalyst for oxidation reactions, which comprises at least one constituent active in the catalysis of oxidation reactions and support therefor, characterized in that the support comprises uranium oxides. The catalyst is notable for a higher stability and activity compared to prior art catalysts.

BACKGROUND OF THE INVENTION

It is known that uranium oxides are suitable as oxidation catalysts for a series of complete and selective oxidations. A typical example of the use of uranium-based catalysts is the CO oxidation to CO2, as has been described, for example, by Campbell et al. in *J. Molec. Cat. A: Chem.*, (2006), 245(1-2), 62-68. Further oxidations catalysed by uranium-containing mixed oxides are, for example, that of isobutene to acrolein (Corberan et al., Ind. Eng. Chem. Prod. Res. Dev., (1984), 24, 546, and 1985, 24, 62) and that of propylene to acrolein and acrylonitrile (U.S. Pat. No. 3,308,151 and U.S. Pat. No. 3,198,750). In addition, the total oxidation of VOCs (volatile organic compounds) over $U_3O_8$ is also known, which has been studied especially by Hutchings et al. (*Nature*, (1996), 384, p 341). Uranium oxide as a support for nanoscale gold particles is described, for example, in *Green Chemistry* (2005), 7(11), 768-770 and (2007) 9(3), 267-272. Applications in the field of hydrogen chloride oxidation are not disclosed in this connection.

As is common knowledge, ruthenium is used especially as a reduction catalyst or as an oxidation catalyst (Handbook of Heterogeneous Catalysis, 1997, p. 2160 and p. 2181).

An oxidation under more severe conditions with regard to temperature and partial oxygen pressure is the process, developed by Deacon in 1868, of catalytic hydrogen chloride oxidation with oxygen:

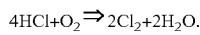

$4HCl+O_2 \Rightarrow 2Cl_2+2H_2O$.

The oxidation of hydrogen chloride to chlorine is an equilibrium reaction. The equilibrium position shifts away from the desired end product with increasing temperature. It is therefore advantageous to use catalysts with maximum activity which allow the reaction to proceed at low temperature.

The first catalysts for hydrogen chloride oxidation comprising the catalytically active constituent of ruthenium were described as early as 1965 in DE 1 567 788, in this case proceeding from $RuCl_3$. The support claimed was $Al_2O_3$ and $SiO_2$. The activity of this combination is relatively low, since these supports cannot provide any lattice oxygen atoms for the oxidation process.

Further Ru-based catalysts with ruthenium oxide or mixed ruthenium oxide as active constituents have been claimed in DE-A 197 48 299. The content of ruthenium oxide is 0.1% by weight to 20% by weight and the mean particle diameter of ruthenium oxide 1.0 nm to 10.0 nm.

Further Ru catalysts supported on titanium oxide or zirconium oxide are known from DE-A 197 34 412. For the preparation of the ruthenium chloride catalysts described therein, which comprise at least one compound from titanium dioxide and zirconium dioxide, a series of Ru starting compounds was specified, for example ruthenium-carbonyl complexes, ruthenium salts of inorganic acids, ruthenium-nitrosyl complexes, ruthenium-amine complexes, ruthenium complexes of organic amines or ruthenium-acetylacetonate complexes. In a preferred embodiment, titanium dioxide in the form of rutile was used as the support. Although Ru catalysts have quite a high activity, they tend to undergo sintering and hence deactivation at relatively high temperatures. To increase the economic viability, however, a further enhancement of the activity combined with good long-term stability is needed.

The supported ruthenium oxidation catalysts developed to date have insufficient activity or stability for hydrogen chloride oxidation. Although it is possible to enhance the activity by increasing the reaction temperature, this leads to sintering/deactivation or to the loss of the catalytically active constituent.

DE 1 078 100 discloses catalysts comprising salts or oxides of silver, uranium or thorium, which are present on inert supports composed of kaolin, silica gel, kieselguhr or pumice. It is not disclosed that the resulting catalysts are calcined, as a result of which a low stability of the catalysts disclosed is to be expected. Moreover, it is not disclosed that the support alone can have a catalytic activity and can consist of uranium oxide. What is disclosed is always a composition which requires the presence of silver and salts or oxides of rare earths. Accordingly, for the lack of further disclosure, it can be assumed that the technical teaching is aimed at a cocatalytic effect which enables a conversion only in an interaction of the individual catalytically active constituents.

This is disadvantageous because both the use of silver and of the salts or oxides of the rare earths lead to the catalyst being economically disadvantageous compared to alternatives without these constituents. Especially the use of silver can be considered to be particularly disadvantageous here in view of the continuously rising costs of this noble metal.

It is thus an object of the present invention to provide a catalyst which accomplishes the oxidation of hydrogen chloride with high activity and/or stability while being obtainable in an economically advantageous manner compared to the prior art.

SUMMARY OF THE INVENTION

It has been found that, surprisingly, the controlled support of metals which are catalytically active in the oxidation, for example ruthenium, on uranium oxides, owing to a particular interaction between catalytically active constituent and support, allows a series of novel high-activity catalysts which have a high catalytic activity to be prepared.

In addition, it has been found that, surprisingly, the inventive catalysts based on uranium oxides have an exceptional stability in an oxygen- and hydrogen chloride-containing atmosphere even at high temperatures, and that it may be possible to dispense with further catalytically active constituents in the case of particular catalysts based on uranium oxides, since these catalysts themselves already have activity and/or stability in the oxidation of hydrogen chloride.

The present invention thus provides a catalyst for oxidation reactions which comprises at least one constituent active in the catalysis of oxidation reactions and support therefor, characterized in that the support is based on a uranium compound, especially uranium oxide.

DETAILED DESCRIPTION

Preference is given to a catalyst in which the support comprises a uranium oxide. Preference is given to uranium oxides, for example $UO_3$, $UO_2$, $UO$, or the nonstoichiometric phases which result from mixtures of these species, for example $U_3O_5$, $U_2O_5$, $U_3O_7$, $U_3O_8$, $U_4O_9$, $U_{13}O_{34}$. Particular preference is given to uranium oxides or mixtures thereof with a stoichiometric composition of $UO_{2.1}$ to $UO_{2.9}$.

Suitable support materials combinable with uranium oxide are, for example, silicon dioxide, titanium dioxide with rutile or anatase structure, zirconium dioxide, aluminium oxide or mixtures thereof, preferably titanium dioxide, zirconium dioxide, aluminium oxide or mixtures thereof, more preferably γ- or δ-aluminium oxide or mixtures thereof.

In a preferred further development of the present invention, the catalyst consists only of a support which comprises uranium oxide.

Thus, in the preferred further development, the at least one constituent active in the catalysis of oxidation reactions is identical to at least one constituent of the support and is a uranium oxide or a mixture of uranium oxides.

This is particularly advantageous because it is thus possible to dispense with the further use of expensive noble metals or semimetals as further active constituents of the catalyst.

In this further development, preference is given to using, as the catalyst, a support which comprises uranium oxides or mixtures thereof with a stoichiometric composition of $UO_{2.1}$ to $UO_{2.9}$. Especially these stoichiometries exhibit a particularly high activity and stability.

The uranium oxides can also be combined with the other support materials just described.

These preferred catalysts in the form of supports comprising uranium oxide or mixtures of uranium oxide as catalysts are particularly advantageous because they surprisingly have an exceptionally high activity and stability for oxidation reactions.

Likewise preferably, the catalyst consists only of a support which comprises uranium oxide and is subjected to a pretreatment.

The pretreatment is typically a pretreatment under the process conditions of the use of the catalyst. Since the catalysts disclosed here are preferably used in the oxidation of HCl with oxygen, a pretreatment with a stoichiometric mixture of oxygen and HCl is preferred. Particular preference is given to a pretreatment with a stoichiometric mixture of HCl and oxygen at at least 400° C., preferably at least 500° C. The pretreatment is effected typically at least for 10 h, preferably at least for 50 h, more preferably at least for 100 h.

The pretreatment can be effected at any temperatures for as long as desired. It has been found that a relatively long and relatively hot pretreatment is better than a relatively short and relatively cold pretreatment. Relatively short and relatively cold pretreatments are also conceivable. It is a question of considering to what extent increased expenditure in the pretreatment which is reflected in enhanced activity can be compensated again by this gain in activity. Therefore, the temperature ranges and durations thus specified should be understood as sensible recommendations but not as technical limitations.

As already described above, it has been found that, surprisingly, the support/catalysts of this invention and here especially the catalysts of the preferred further development in which the catalyst consists only of a support which comprises uranium oxide, gain activity on exposure to high temperature under process conditions in the sense of a pretreatment. The behaviour of all known catalysts in this respect is essentially contrary.

When, as well as the support comprising uranium oxide, a further catalytically active constituent is used, preference is given to a catalyst in which the catalytically active constituent is applied to the support in the form of an aqueous solution or suspension and the solvent is then removed.

Particular preference is given to a catalyst which is characterized in that the further catalytically active constituent is applied to the support as an aqueous solution or suspension of ruthenium halides, oxides, hydroxides or oxyhalides, in each case alone or in any mixture, and the solvent is then removed.

Useful further catalytically active constituents include all constituents which catalyse the oxidation of hydrogen chloride. For example, the following elements or compounds thereof are suitable: ruthenium, osmium, rhodium, iridium, palladium, platinum, copper, silver, gold, rhenium, bismuth, cobalt, iron, chromium or mixtures thereof. In a preferred embodiment, ruthenium and its compounds are used. In a very preferred embodiment, without being restricted thereto, ruthenium is used in oxidic form or as a chloride compound or as an oxychloride compound.

In a further embodiment of the process according to the invention, the further catalytically active constituent is applied to the support in a nonoxidic form and converted to the oxidized form in the course of the reaction.

Typically, the loading with the catalytically active constituent is in the range of 0.1 to 80% by weight, preferably in the range of 1 to 50% by weight, more preferably in the range of 1 to 25% by weight, based on the total weight of catalyst and support.

The further catalytically active constituent can be applied by various methods. For example, and without being restricted thereto, it is possible to use moist and wet impregnation of a support with suitable starting compounds present in solution, or starting compounds in liquid or colloidal form, precipitation and coprecipitation processes, and also ion exchange and gas phase coating (CVD, PVD). Preference is given to a combination of impregnation and subsequent precipitation with reducing substances (preferably hydrogen, hydrides or hydrazine compounds) or alkaline substances (preferably NaOH, KOH or ammonia).

Useful promoters include basic metals (e.g. alkali metals, alkaline earth metals and rare earth metals); preference is given to alkali metals, especially Na and Cs, and alkaline earth metals; particular preference is given to alkaline earth metals, especially Sr and Ba, and the rare earth metal Ce.

Any promoters present in addition to the further active constituent, without being restricted thereto, may be applied to the catalyst by impregnation and CVD methods; preference is given to an impregnation, especially preferably after application of the further catalytically active constituent.

To stabilize the dispersion of the further catalytically active constituent, for example, without being restricted thereto, it is possible to use various dispersion stabilizers, for example scandium compounds, manganese oxides and lanthanum oxides. The stabilizers are preferably applied by impregnation and/or precipitation together with the further catalytic constituent.

The catalysts can be dried under standard pressure or preferably under reduced pressure under a nitrogen, argon or air atmosphere at 40 to 200° C. The drying time is preferably 10 min to 24 h.

The catalysts can be used in uncalcined or calcined form. The calcination can be effected in reducing, oxidizing or inert phase; preference is given to calcination in an air stream or in a nitrogen stream.

This calcination can be employed on the inventive catalyst comprising a catalytically active constituent on a support based on a uranium compound, especially uranium oxide, but also on the catalyst according to the preferred further development in which the at least one constituent active in the catalysis of oxidation reactions is simultaneously also the support.

In the case of a catalyst according to the preferred further development of the invention, the calcination is effected in the form of supports comprising uranium oxide or mixtures of uranium oxide as catalysts, in the presence of or with the exclusion of oxygen, within a temperature range of 500 to 1200° C., preferably in the range of 700 to 1000° C.

In the case of a catalyst comprising support and further catalytically active constituent, the calcination is effected in the presence of oxidizing gases within a temperature range of 150 to 500° C., preferably in the range of 150° C. to 300° C.

For the application of the novel catalysts, as already described above, preference is given to using the catalytic process known as the Deacon process. In this process, hydrogen chloride is oxidized with oxygen in an exothermic equilibrium reaction to give chlorine, which affords steam. The reaction temperature is typically 150 to 450° C.; the customary reaction pressure is 1 to 25 bar. Since this is an equilibrium reaction, it is appropriate to work at minimum temperatures at which the catalyst still has sufficient activity. Moreover, it is appropriate to use oxygen in superstoichiometric amounts relative to hydrogen chloride. For example, a two- to four-fold oxygen excess is customary. Since there is no risk of any selectivity losses, it may be economically advantageous to work at relatively high pressure and correspondingly for a longer residence time compared to standard pressure.

Suitable preferred catalysts for the Deacon process comprise ruthenium oxide, ruthenium chloride or other ruthenium compounds. Suitable catalysts can be obtained, for example, by applying ruthenium chloride to the support and subsequently drying, or drying and calcining. Suitable catalysts may comprise, in addition to or instead of a ruthenium compound, also compounds of other meals, for example gold, palladium, platinum, osmium, iridium, silver, copper, chromium, uranium or rhenium. Suitable catalysts may further comprise chromium(III) oxide.

The catalytic hydrogen chloride oxidation can be performed adiabatically or preferably isothermally or approximately isothermally, batchwise but preferably continuously, as a fluidized bed or fixed bed process, preferably as a fixed bed process, more preferably in tube bundle reactors over heterogeneous catalysts at a reactor temperature of 180 to 450° C., preferably 200 to 400° C., more preferably 220 to 350° C., and a pressure of 1 to 25 bar (1000 to 25 000 hPa), preferably 1.2 to 20 bar, more preferably 1.5 to 17 bar and especially 2.0 to 15 bar.

Customary reaction apparatus in which the catalytic hydrogen chloride oxidation is performed includes fixed bed or fluidized bed reactors. The catalytic hydrogen chloride oxidation can preferably also be carried out in several stages.

In the adiabatic, isothermal or approximately isothermal operating mode, it is also possible to use a plurality of, i.e. 2 to 10, preferably 2 to 6, more preferably 2 to 5 and especially 2 to 3 reactors connected in series with intermediate cooling. The hydrogen chloride can either be added completely together with the oxygen upstream of the first reactor or divided over the different reactors. This series connection of individual reactors can also be combined in one apparatus.

A further preferred embodiment of an apparatus suitable for the process consists in using a structured catalyst bed in which the catalyst activity rises in flow direction. Such a structuring of the catalyst bed can be effected by different impregnation of the catalyst supports with active composition or by different dilution of the catalyst with an inert material. The inert materials used may, for example, be rings, cylinders or spheres of titanium dioxide, zirconium dioxide or mixtures thereof, aluminium oxide, steatite, ceramic, glass, graphite or stainless steel. In the case of the preferred use of shaped catalyst bodies, the inert material should preferably have similar external dimensions.

Suitable shaped catalyst bodies proceeding from uranium oxide include shaped bodies of any shapes; preference is given to tablets, rings, cylinders, stars, wagonwheels or spheres; particular preference is given to spheres, rings, cylinders or star extrudates as the shape.

The catalyst can be shaped after or preferably before the impregnation of the support material.

The conversion of hydrogen chloride in single pass can be limited preferably to 15 to 90%, preferably 40 to 85%, more preferably 50 to 70%. Unconverted hydrogen chloride can, after removal, be recycled partly or fully into the catalytic hydrogen chloride oxidation. The volume ratio of hydrogen chloride to oxygen at the reactor entry is preferably between 1:1 and 20:1, preferably 2:1 and 8:1, more preferably 2:1 and 5:1.

The heat of reaction of the catalytic hydrogen chloride oxidation can be utilized advantageously to raise high-pressure steam. This can be utilized for the operation of a phosgenation reactor and/or of distillation columns, especially isocyanate distillation columns.

The inventive catalyst for hydrogen chloride oxidation is notable for a high activity at low temperature. Without being bound to a theory, it is assumed that the uranium oxide can make a positive contribution to the catalytic cycle via the ability to provide lattice oxygen atoms.

EXAMPLES

Example 1

Uranium(VI) Oxide Support Comprising Ru

In a beaker, 1 g of uranium(VI) oxide precalcined at 500° C. for 4 h (from Strem Chemicals) was suspended in a solution of 0.053 g of ruthenium(III) chloride hydrate in 2.8 ml of water and stirred at room temperature for 60 min. Subsequently, the water was removed in an air stream at 60° C./4 h. The calcination was effected at 250° C. in an air stream for 16 h, which afforded a ruthenium catalyst comprising, calculated theoretically, 2% by weight of Ru supported on uranium (VI) oxide.

Example 2

Uranium(IV) Oxide Support Comprising Ru

A 2% by weight Ru catalyst on uranium(IV) oxide support was prepared analogously to Example 1, with the sole difference that uranium(IV) oxide precalcined at 500° C. for 4 h (from Strem Chemicals) was used.

Example 3

$U_3O_8$ Comprising Ru

A 2% by weight Ru catalyst on uranium(V/VI) oxide support was prepared analogously to Example 1, with the sole difference that uranium(V/VI) oxide precalcined at 500° C. for 4 h (from Strem Chemicals) was used.

Example 4

Uranium Oxide Support Comprising Ru 1 g of uranyl acetate dihydrate (from Fluka) was calcined at 300° C. for 2 h and at 800° C. for 4 h. $RuCl_3$ hydrate was applied to 0.3 g of the oxidic uranium support analogously to Example 1, such that the Ru content was 2% by weight.

Example 5

Pure Uranium(IV) Oxide Support 2 g of pulverulent uranium(IV) oxide (from Strem Chemicals) were dried at ambient pressure in a drying cabinet at 150° C. overnight and then calcined at 500° C. under air for 2 h.

Example 6

Pure Uranium(VI) Oxide Support 2 g of pulverulent uranium(VI) oxide (from Strem Chemicals) were dried at ambient pressure in a drying cabinet at 150° C. overnight and then calcined at 500° C. under air for 2 h.

Example 7

Mixed Uranium(V/VI) Oxide Support 2 g of pulverulent uranium(V/VI) oxide (from Strem Chemicals) were dried at ambient pressure in a drying cabinet at 150° C. overnight and then calcined at 500° C. under air for 2 h.

Example 8

Mixed Uranium(V/VI) Oxide Support with Pretreatment

The catalyst obtained from Example 7 was subjected to a pretreatment at 540° C. under 80 ml/min of HCl and 80 ml/min of $O_2$ for 100 h. This resulted in a pretreated catalyst according to Example 8.

Example 9

Preparation of a Uranium Oxide and Aluminium Oxide Support

In a beaker, 2 g of gamma-$Al_2O_3$ shaped bodies (diameter approx. 1.5 mm, from Saint Gobain, BET of 260 m$^2$/g) were impregnated with a 10% by weight aqueous solution of uranyl acetate dihydrate (from Riedel de Haen) by spraying. After an action time of 1 h, the water was removed in an air stream at 80° C. for 2 h. The procedure was repeated until a content of 12% by weight of uranium on the shaped bodies was calculated.

The shaped bodies were subsequently calcined in an air stream at 800° C. for 4 hours.

Example 10

Preparation and Analysis of a Uranium Oxide and Aluminium Oxide Support

Analogously to Example 9, 40 g of shaped bodies of gamma-$Al_2O_3$ (from Saint Gobain, BET of 200 m$^2$/g) were impregnated with uranium and calcined.

Analysis by means of XRD (SIEMENS D 5000 theta/theta reflection diffractometer) showed the presence of gamma-$Al_2O_3$ and $U_3O_8$.

Example 11-14

Use of the Catalysts from Examples 1-4 in HCl Oxidation at 300° C.

0.2 g of the catalysts obtained according to Example 1-4 was ground and introduced into a quartz reaction tube (diameter ~10 mm) as a mixture with 1 g of quartz sand (100-200 µm).

The quartz reaction tube was heated to 300° C. and then operated at this temperature.

A gas mixture of 80 ml/min of HCl and 80 ml/min of oxygen was passed through the quartz reaction tube. After 30 minutes, the product gas stream was passed into a 16% by weight potassium iodide solution for 10 minutes and the iodine thus formed was back-titrated with a 0.1N thiosulphate solution in order to determine the amount of chlorine introduced.

This gave the productivities of the catalysts at 300° C. shown in Table 1.

TABLE 1

Productivities of the catalysts according to Examples 1-4 in Examples 11-14

| Example | Catalyst according to example | Productivity at 300° C. [$kg_{Cl2}/kg_{cat}$*h] |
|---|---|---|
| 11 | 1 | 0.12 |
| 12 | 2 | 0.15 |
| 13 | 3 | 0.14 |
| 14 | 4 | 0.23 |

Examples 15-19

Use of the Catalysts from Examples 5-9 in the HCl Oxidation at 540° C.

Experiments analogous to those of Examples 11-14 were carried out for the catalysts according to Examples 5-9, except that the quartz reaction tube was now heated to 540° C. and was then operated at this temperature.

This gave the productivities of the catalysts at 540° C. shown in Table 2.

Examples 20-24

Use of the Catalysts from Examples 5-9 in HCl Oxidation at 600° C.

Experiments analogous to those of Examples 11-14 were carried out for the catalysts according to Examples 5-9, except that the quartz reaction tube was now heated to 600° C. and was then operated at this temperature.

This gave the productivities of the catalysts at 600° C. shown in Table 2.

TABLE 2

Productivities of the catalysts according to Examples 5-9 in Examples 15-24

| Examples | Catalyst according to example | Productivity at 540° C. [$kg_{Cl2}/kg_{cat}$*h] | Productivity at 600° C. [$kg_{Cl2}/kg_{cat}$*h] |
|---|---|---|---|
| 15, 20 | 5 | 5.26 | 8.33 |
| 16, 21 | 6 | 2.39 | 5.59 |

TABLE 2-continued

Productivities of the catalysts according
to Examples 5-9 in Examples 15-24

| Examples | Catalyst according to example | Productivity at 540° C. [kg$_{Cl2}$/kg$_{cat}$*h] | Productivity at 600° C. [kg$_{Cl2}$/kg$_{cat}$*h] |
|---|---|---|---|
| 17, 22 | 7 | 4.04 | 5.92 |
| 18, 23 | 8 | 5.92 | 10.54 |
| 19, 24 | 9 | 5.93 | 9.53 |

The invention claimed is:

1. Catalyst for hydrogen chloride oxidation which comprises at least one catalytically active constituent which is active in the catalysis of oxidation reactions and a support therefore, wherein the support comprises uranium oxides or mixtures thereof with a stoichiometric composition of $UO_{2.1}$ to $UO_{2.9}$.

2. Catalyst according to claim 1, wherein the support additionally comprises silicon dioxide, titanium dioxide with rutile or anatase structure, zirconium dioxide, aluminum oxide or mixtures thereof.

3. Catalyst according to claim 1, comprising, as a further catalytically active constituent, at least one element selected from the group consisting of: ruthenium, osmium, rhodium, iridium, palladium, platinum, copper, silver, gold, rhenium, bismuth, cobalt, vanadium, chromium, manganese, nickel, tungsten and iron.

4. Catalyst according to claim 3, wherein the further catalytically active constituent comprises ruthenium.

5. Catalyst according to claim 3, wherein the further catalytically active constituent is applied to the support in the form of an aqueous solution or suspension and the solvent is removed.

6. Catalyst according to claim 5, wherein the further catalytically active constituent is applied to the support as an aqueous solution or suspension of ruthenium halides, oxides, hydroxides or oxyhalides, in each case alone or in any mixture, and the solvent is removed.

7. Catalyst according to claim 6, pretreated with a stoichiometric mixture of oxygen and HCl at temperatures of at least 400° C. for at least 10 h.

8. Catalyst according to claim 1, wherein the active constituent is identical to at least one constituent of the support and is a uranium oxide or a mixture of uranium oxides.

9. Catalyst of claim 1, wherein said uranium oxides or mixtures thereof are selected from the group consisting of $U_2O_5$, $U_3O_7$, $U_3O_8$, $U_4O_9$, and $U_{13}O_{34}$.

10. A method for the catalytic gas phase oxidation of hydrogen chloride with oxygen, which comprises carrying out said oxidation in the presence of a catalyst of claim 1.

* * * * *